United States Patent
Mumcuoglu et al.

(10) Patent No.: US 10,075,461 B2
(45) Date of Patent: Sep. 11, 2018

(54) DETECTION OF ANOMALOUS ADMINISTRATIVE ACTIONS

(71) Applicant: Light Cyber Ltd., Ramat Gan (IL)

(72) Inventors: Michael Mumcuoglu, Jerusalem (IL); Giora Engel, Mevasseret-Zion (IL); Yaron Neuman, Zoran-Kadima (IL); Eyal Firstenberg, Ramat HaSharon (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 29 days.

(21) Appl. No.: 14/726,539

(22) Filed: May 31, 2015

(65) Prior Publication Data
US 2017/0054744 A1 Feb. 23, 2017

(51) Int. Cl.
*H04L 29/06* (2006.01)

(52) U.S. Cl.
CPC ...... *H04L 63/1425* (2013.01); *H04L 63/1408* (2013.01); *H04L 63/1441* (2013.01); *H04L 63/145* (2013.01); *H04L 2463/146* (2013.01)

(58) Field of Classification Search
CPC ... H04L 63/1433; G06N 5/048; G06F 21/554; G06F 21/552; G06Q 50/22; G06Q 40/08
See application file for complete search history.

(56) References Cited

U.S. PATENT DOCUMENTS

| | | |
|---|---|---|
| 5,991,881 A | 11/1999 | Conklin et al. |
| 6,347,374 B1 | 2/2002 | Drake et al. |
| 7,178,164 B1 * | 2/2007 | Bonnes ............... G06F 21/604 726/2 |
| 7,694,150 B1 | 4/2010 | Kirby |
| 7,703,138 B2 | 4/2010 | Desai et al. |
| 7,752,665 B1 | 7/2010 | Robertson et al. |
| 8,429,180 B1 | 4/2013 | Sobel et al. |
| 8,490,190 B1 | 7/2013 | Hernacki et al. |
| 8,555,388 B1 | 10/2013 | Wang et al. |
| 8,677,487 B2 | 3/2014 | Balupari et al. |
| 8,925,095 B2 | 12/2014 | Herz et al. |

(Continued)

FOREIGN PATENT DOCUMENTS

| | | |
|---|---|---|
| EP | 0952521 A2 | 10/1999 |
| EP | 2056559 A1 | 5/2009 |

OTHER PUBLICATIONS

Shulman el al., "Top Ten Database Security Threats How to Mitigate the Most Significant Database Vulnerabilities" white paper, Imperva Inc (2006); pp. 1-14.*

(Continued)

*Primary Examiner* — Harunur Rashid
(74) *Attorney, Agent, or Firm* — D. Kligler IP Services Ltd.

(57) ABSTRACT

A method for monitoring includes defining a plurality of different types of administrative activities in a computer system. Each administrative activity in the plurality includes an action performed by one of the computers in the system that can be invoked only by a user having an elevated level of privileges in the system. The administrative activities performed by at least a group of the computers in the system are tracked automatically. Upon detecting that a given computer in the system has performed an anomalous combination of at least two of the different types of administrative activities, an action is initiated to inhibit malicious exploitation of the given computer.

15 Claims, 4 Drawing Sheets

(56) References Cited

U.S. PATENT DOCUMENTS

| | | |
|---|---|---|
| 8,966,625 B1 | 2/2015 | Zuk et al. |
| 9,038,178 B1 | 5/2015 | Lin |
| 9,147,071 B2 | 9/2015 | Sallam |
| 9,342,691 B2 | 5/2016 | Maestas |
| 9,378,361 B1 | 6/2016 | Yen et al. |
| 9,386,028 B2 | 7/2016 | Altman |
| 2003/0110396 A1 | 6/2003 | Lewis et al. |
| 2004/0117658 A1 | 6/2004 | Klaes |
| 2004/0210769 A1 | 10/2004 | Radatti et al. |
| 2004/0250169 A1 | 12/2004 | Takemori et al. |
| 2004/0260733 A1 | 12/2004 | Adelstein et al. |
| 2005/0262560 A1 | 11/2005 | Gassoway |
| 2005/0268112 A1 | 12/2005 | Wang et al. |
| 2006/0018466 A1 | 1/2006 | Adelstein et al. |
| 2006/0075462 A1 | 4/2006 | Golan |
| 2006/0075492 A1 | 4/2006 | Golan et al. |
| 2006/0075500 A1 | 4/2006 | Bertman et al. |
| 2006/0136720 A1 | 6/2006 | Armstrong et al. |
| 2006/0149848 A1 | 7/2006 | Shay |
| 2006/0161984 A1 | 7/2006 | Phillips et al. |
| 2006/0191010 A1 | 8/2006 | Benjamin |
| 2006/0282893 A1 | 12/2006 | Wu et al. |
| 2007/0072661 A1 | 3/2007 | Lototski |
| 2007/0214088 A1* | 9/2007 | Graham ............ H04L 63/1416 705/51 |
| 2007/0218874 A1 | 9/2007 | Sinha et al. |
| 2007/0226796 A1 | 9/2007 | Gilbert et al. |
| 2007/0283166 A1 | 12/2007 | Yami et al. |
| 2008/0005782 A1 | 1/2008 | Aziz |
| 2008/0016339 A1 | 1/2008 | Shukla |
| 2008/0016570 A1 | 1/2008 | Capalik |
| 2008/0104046 A1 | 5/2008 | Singla et al. |
| 2008/0104703 A1 | 5/2008 | Rihn et al. |
| 2008/0134296 A1 | 6/2008 | Amitai et al. |
| 2008/0198005 A1 | 8/2008 | Schulak et al. |
| 2008/0271143 A1 | 10/2008 | Stephens et al. |
| 2009/0007100 A1 | 1/2009 | Field et al. |
| 2009/0007220 A1 | 1/2009 | Ormazabal et al. |
| 2009/0157574 A1 | 6/2009 | Lee |
| 2009/0320136 A1 | 12/2009 | Lambert et al. |
| 2010/0107257 A1 | 4/2010 | Ollmann |
| 2010/0162400 A1 | 6/2010 | Feeney et al. |
| 2010/0197318 A1 | 8/2010 | Petersen et al. |
| 2010/0212013 A1 | 8/2010 | Kim et al. |
| 2010/0217861 A1 | 8/2010 | Wu |
| 2010/0268818 A1 | 10/2010 | Richmond et al. |
| 2010/0278054 A1 | 11/2010 | Dighe |
| 2010/0299430 A1 | 11/2010 | Powers et al. |
| 2011/0153748 A1 | 6/2011 | Lee et al. |
| 2011/0185421 A1 | 7/2011 | Wittenstein et al. |
| 2011/0214187 A1 | 9/2011 | Wittenstein et al. |
| 2011/0225650 A1* | 9/2011 | Margolies ............ G06F 21/554 726/22 |
| 2011/0247071 A1 | 10/2011 | Hooks et al. |
| 2011/0265011 A1 | 10/2011 | Taylor et al. |
| 2011/0270957 A1 | 11/2011 | Phan et al. |
| 2011/0302653 A1 | 12/2011 | Frantz et al. |
| 2011/0321175 A1* | 12/2011 | Slater ................ G06F 21/552 726/28 |
| 2012/0079596 A1 | 3/2012 | Thomas et al. |
| 2012/0102359 A1 | 4/2012 | Hooks |
| 2012/0136802 A1 | 5/2012 | Mcquade et al. |
| 2012/0137342 A1 | 5/2012 | Hartrell et al. |
| 2012/0143650 A1 | 6/2012 | Crowley et al. |
| 2012/0191660 A1 | 7/2012 | Hoog |
| 2012/0222120 A1 | 8/2012 | Rim et al. |
| 2012/0233311 A1 | 9/2012 | Parker et al. |
| 2012/0275505 A1 | 11/2012 | Tzannes et al. |
| 2012/0331553 A1 | 12/2012 | Aziz et al. |
| 2013/0097706 A1 | 4/2013 | Titonis et al. |
| 2013/0111211 A1 | 5/2013 | Winslow et al. |
| 2013/0196549 A1 | 8/2013 | Sorani |
| 2013/0298243 A1 | 11/2013 | Kumar et al. |
| 2014/0165207 A1 | 6/2014 | Engel et al. |
| 2014/0196115 A1* | 7/2014 | Pelykh .................. H04L 63/08 726/4 |
| 2014/0325643 A1 | 10/2014 | Bart et al. |
| 2015/0040219 A1* | 2/2015 | Garraway ............ G06F 21/554 726/22 |
| 2015/0047032 A1 | 2/2015 | Hannis et al. |
| 2015/0121461 A1 | 4/2015 | Dulkin et al. |
| 2015/0195300 A1* | 7/2015 | Adjaoute ............ H04L 63/1433 726/25 |
| 2015/0200821 A1* | 7/2015 | Sade .................... H04L 67/28 709/224 |
| 2015/0264069 A1 | 9/2015 | Beauchesne et al. |
| 2015/0286819 A1* | 10/2015 | Coden .................. G06F 21/552 726/23 |
| 2015/0304346 A1 | 10/2015 | Kim |
| 2016/0191918 A1 | 6/2016 | Lai et al. |
| 2016/0306965 A1* | 10/2016 | Iyer ...................... G06F 21/552 |
| 2016/0315954 A1* | 10/2016 | Peterson ............ H04L 63/1416 |

OTHER PUBLICATIONS

European Application # 14741051.8 Search Report dated Jul. 15, 2016.

Bilge et at., "Disclosure: Detecting Botnet Command and Control Servers Through Large-Scale NetFlow Analysis", ACSAC, 10 Pages, Dec. 3-7, 2012.

Blum., "Combining Labeled and Unlabeled Data with Co-Training", Carnegie Mellon University, Research Showcase @ CMU, Computer Science Department, 11 pages, Jul. 1998.

Felegyhazi et al., "On the Potential of Proactive Domain Blacklisting", LEET'10 Proceedings of the 3rd USENIX Conference on Large-scale exploits and emergent threats, 8 pages, San Jose, USA, Apr. 27, 2010.

Frosch., "Mining DNS-related Data for Suspicious Features", Ruhr Universitat Bochum, Master'sThesis, 88 pages, Dec. 23, 2011.

Bilge at al., "Exposure: Finding Malicious Domains Using Passive DNS Analysis", NDSS Symposium, 17 pages, Feb. 6-9, 2011.

Gross et al., "FIRE: Finding Rogue nEtworks", Annual Conference on Computer Security Applications (ACSAC'09), 10 pages, Dec. 7-11, 2009.

Markowitz, N., "Bullet Proof Hosting: A Theoretical Model", Security Week, 5 pages, Jun. 29, 2010, downloaded from http://www.infosecisland.com/blogview/4487-Bullet-Proof-Hosting-A-Theoretical-Model.html.

Konte et al., "ASwatch: An AS Reputation System to Expose Bulletproof Hosting ASes", SIGCOMM, pp. 625-638, Aug. 17-21, 2015.

Markowitz, N., "Patterns of Use and Abuse with IP Addresses", Security Week, 4 pages, Jul. 10, 2010, downloaded from http://infosecisland.com/blogview/5068-Patterns-of-Use-and-Abuse-with-IP-Addresses.html.

Wei et al., "Identifying New Spam Domains by Hosting IPs: Improving Domain Blacklisting", Department of Computer and Information Sciences, University of Alabama at Birmingham, USA, 8 pages, Dec. 8, 2010.

Goncharov,M., "Criminal Hideouts for Lease: Bulletproof Hosting Services", Forward-Looking Threat Research (FTR) Team, A TrendLabsSM Research Paper, 28 pages, Jul. 3, 2015.

International Patent Application # PCT/IL2012/050272 Search Report dated Nov. 28, 2012.

Tier-3 Pty Ltd, "Huntsman Protector 360", Brochure, 2 pages, Apr. 1, 2010.

Tier-3 Pty Ltd, "Huntsman 5.7 The Power of 2", Brochure, 2 pages, Oct. 8, 2012.

Light Cyber Ltd, "LightCyber Magna", 3 pages, year 2011.

International Application # PCT/IB2014/058299 Search report dated May 25, 2014.

European Application # 12817760.7 Search Report dated Apr. 1, 2015.

Mumcuoglu et al., U.S. Appl. No. 14/758,966, filed Jul. 2, 2015.

U.S. Appl. No. 14/234,165 Office Action dated Mar. 25, 2015.

U.S. Appl. No. 14/234,165 Office Action dated Sep. 22, 2015.

(56) References Cited

OTHER PUBLICATIONS

European Application # 16167582.2 Search Report dated Aug. 2, 2016.
U.S. Appl. No. 14/758,966 Office Action dated Oct. 26, 2016.
Niksun, "Network Intrusion Forensic System (NIFS) for Intrusion Detection and Advanced Post Incident Forensics", Whitepaper, 12 pages, Feb. 15, 2010.
U.S. Appl. No. 15/286,674 Office Action dated Apr. 12, 2017.
U.S. Appl. No. 15/286,643 Office Action dated Mar. 17, 2017.
U.S. Appl. No. 15/075,343 Office Action dated Mar. 30, 2017.
U.S. Appl. No. 14/758,966 Office Action dated May 19, 2017.
EP Application # 16167582.2 office action dated Nov. 17, 2017.

\* cited by examiner

DETECTION OF ANOMALOUS ADMINISTRATIVE ACTIONS

FIELD OF THE INVENTION

The present invention relates generally to computer systems and networks, and particularly to apparatus, method and software for detecting malicious activity in computer networks.

BACKGROUND

In many computer and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to prevent malware from spreading through the network.

In this latter category, for example, PCT International Publication WO 2013/014672, whose disclosure is incorporated herein by reference, describes a method and system for detecting anomalous action within a computer network. The method starts with collecting raw data from at least one probe sensor that is associated with at least one router, switch or server in the computer network. The raw data is parsed and analyzed to create meta-data from the raw data, and computer network actions are identified based on knowledge of network protocols. The meta-data is associated with entities by analyzing and correlating between the identified network actions. A statistical model of the computer network is created, for detection of anomalous network actions associated with the entities.

As another example, PCT International Publication WO 2014/111863, whose disclosure is incorporated herein by reference, describes a method for computer system forensics that includes receiving an identification of at least one host computer that has exhibited an anomalous behavior, in a computer network comprising multiple host computers. Respective images of the host computers in the network are assembled using image information collected with regard to the host computers. A comparison is made between at least one positive image of the at least one host computer, assembled using the image information collected following occurrence of the anomalous behavior, and one or more negative images assembled using the image information collected with respect to one or more of the host computers not exhibiting the anomalous behavior. Based on the comparison, a forensic indicator of the anomalous behavior is extracted from the positive and negative images.

SUMMARY

Embodiments of the present invention that are described hereinbelow provide methods, apparatus and software for detecting and inhibiting malicious activity in a computer network.

There is therefore provided, in accordance with an embodiment of the invention, a method for monitoring, which includes defining a plurality of different types of administrative activities in a computer system. Each administrative activity in the plurality includes an action performed by one of the computers in the system that can be invoked only by a user having an elevated level of privileges in the system. The administrative activities performed by at least a group of the computers in the system are tracked automatically. Upon detecting that a given computer in the system has performed an anomalous combination of at least two of the different types of administrative activities, an action is initiated to inhibit malicious exploitation of the given computer.

In a disclosed embodiment, the different types of the administrative activities are selected from a set of activities consisting of use of a secure shell protocol; login as an administrator; remote code execution; access to administrative resource shares; remote desktop operation on servers in the system; access to servers of servers in the system; and access to specified Web addresses that are reserved for administration. Additionally or alternatively, defining the plurality of different types of administrative activities includes specifying a set of administrative protocols, and tracking the administrative activities includes detecting uses of the administrative protocols in the set. Further additionally or alternatively the different types of the administrative activities include accessing non-existent network addresses and non-existent subnets.

In some embodiments, tracking the administrative activities includes establishing, for each of the computers in the group, a respective baseline level of the administrative activities, and detecting that a computer has performed an anomalous combination of the administrative activities includes detecting a deviation from the respective baseline level of the computer. Typically, establishing the respective baseline level includes identifying a set of the administrative activities performed by the computer over a first period of time, and detecting the deviation includes sensing, during a second period of time following the first period, that the computer has performed a type of administrative activity not in the identified set.

Additionally or alternatively tracking the administrative activities includes establishing a profile of the administrative activities performed over the group of the computers, and detecting that a computer has performed an anomalous combination of the administrative activities includes applying the profile in analyzing the administrative activities performed by the computer.

In a disclosed embodiment, establishing the profile includes assigning respective weights to the administrative activities responsively to respective frequencies of performance of the administrative activities by the computers in the system, such that the respective weights decrease as the respective frequencies increase, and analyzing the administrative activities includes computing a score by applying the weights to the administrative activities performed by the computer, and deciding that the combination of the administrative activities performed by the computer is anomalous if the score exceeds a predefined threshold. Typically, assigning the respective weights includes calculating a respective weight for each type of administrative activity in inverse proportion to a number of the computers performing the administrative activity.

There is also provided, in accordance with an embodiment of the invention, monitoring apparatus, which includes a memory, configured to store a definition of a plurality of different types of administrative activities in a computer system. A processor is configured to automatically track the administrative activities performed by at least a group of the computers in the system, and upon detecting that a computer in the system has performed an anomalous combination of at least two of the different types of administrative activities, to initiate an action to inhibit malicious exploitation of the given computer.

There is additionally provided, in accordance with an embodiment of the invention, a computer software product, including a non-transitory computer-readable medium in which program instructions are stored, which instructions, when read by a computer, cause the computer to store a definition of a plurality of different types of administrative activities in a computer system. The instructions cause the computer to automatically track the administrative activities performed by at least a group of the computers in the system, and upon detecting that a given computer in the system has performed an anomalous combination of at least two of the different types of administrative activities, to initiate an action to inhibit malicious exploitation of the given computer.

The present invention will be more fully understood from the following detailed description of the embodiments thereof, taken together with the drawings in which:

DETAILED DESCRIPTION OF EMBODIMENTS

Overview

Figure 1:
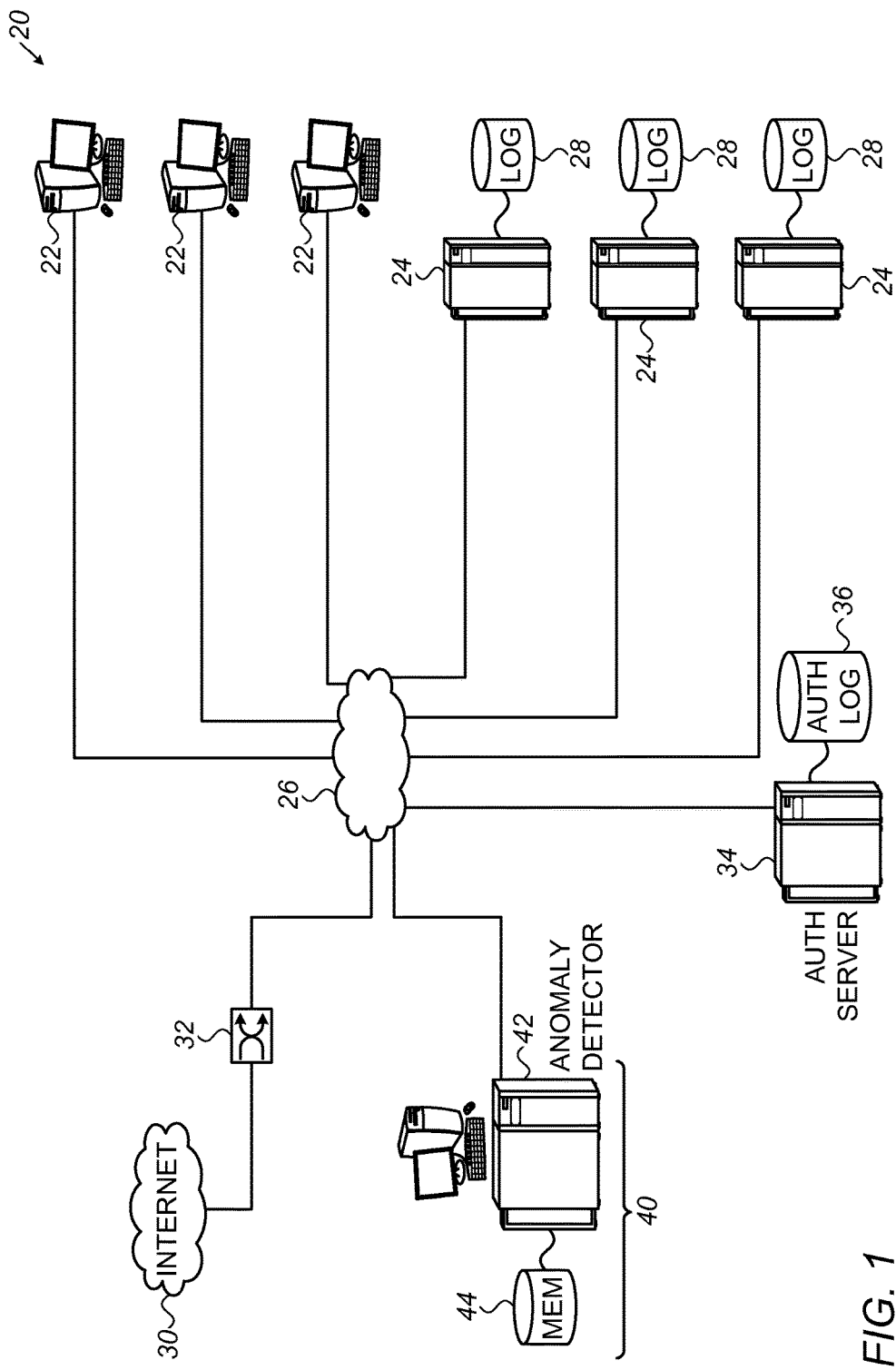
FIG. 1 is a block diagram that schematically shows a computer system, in accordance with an embodiment of the present invention.

In almost every computer system (including computer networks), there are at least two different classes of users:

Standard users, who are allowed to operate the computer system and save documents, and may be able to install application programs and change personal settings, but cannot access settings and files belonging to the computer operating system.

Administrators, who have access to read and write any data in the system, add or remove any programs, and change operating system settings.

In larger systems, there are frequently subdivisions within these classes. There remains, however, a clear division between "standard users" and "administrators" in nearly all multi-computer systems.

The distinction within the computer system between standard users and administrators (as well as between subdivisions of these classes) is expressed in terms of their respective levels of privilege. In the context of the present description and in the claims, "privilege" is defined as permission to perform a certain type of action in a computer system, subject to verification of the identity of the entity performing the action. In this sense, administrators have a higher level of privilege than standard users, since administrators can perform types of action that are barred to other users. Thus, in this context, administrative activities are defined as actions requiring elevated levels of privilege, which are normally permitted only to users who can present credentials verifying their identity as administrators.

Although under normal circumstances, elevated levels of privilege are permitted (as stated above) only to credentialed administrators, in many, if not most, cyber-attacks, the attacker attempts to gain an elevated level of privilege to which he or she is not entitled. This elevation of privilege may be gained, for example, by stealing or otherwise misappropriating the credentials of a legitimate administrator, or by exploiting a vulnerability in the system to take over the privileges of an existing software process. The elevated privileges enable the attacker to perform administrative actions by which he can steal, alter, or destroy certain data and/or operating components of the system under attack.

Although known types of attacks may be identified by their characteristic signatures, such techniques are ineffective in detecting new and targeted types of attacks, not to mention attacks based on misappropriation or misuse of legitimate administrative privileges. There is thus a need to recognize suspicious administrative activities, among the large body of administrative activities that occur every day, so that illegitimate activities can be promptly detected and inhibited.

Embodiments of the present invention that are described herein address this need by detecting anomalous administrative activities, which deviate from the normal pattern of administrative activities in a computer system. As explained above, administrative activities are defined in this context as actions performed by a computer in the computer system that can be invoked only by a user having an elevated level of privileges in the system. For the purposes of detecting possible security breaches, multiple different types of administrative activities are defined and tracked over all of the computers, or at least over a group of the computers, in the system being monitored. When a computer in the system performs an anomalous combination of two or more different types of these administrative activities, the combination is identified as suspicious, and action is initiated to inhibit malicious exploitation of these activities.

A combination of administrative activities is considered anomalous if it deviates from normal patterns of administrative activities in the system. It is difficult or impossible to define a "normal pattern" a priori, however, since such patterns can differ substantially from organization to organization and from system to system, and even among different computers in the same system. For example, not only will normal patterns of administrative activity differ between computers operated by standard users and those used by administrators, but even among different administrators the patterns of activity will vary depending on their respective roles and responsibilities.

Therefore, in some embodiments that are described below, a respective baseline level of administrative activities is established for each of the monitored computers. Anomalous combinations of administrative activities on any given computer are identified as deviations from the respective baseline level of that particular computer. The baseline level is established by learning the set of administrative activities performed by the given computer over a certain period of time, and a deviation is typically detected when the computer performs a type of administrative activity that is not in this set. In this manner, suspicious uses of legitimate administrative credentials may be detected, such as when the credentials of a given administrator, who normally performs a certain set of administrative activities, are suddenly used for a different type of administrative activity. This feature is important, since different administrators within a given system typically have different spheres of activity.

Furthermore, patterns of administrative activities typically vary substantially among different computer systems. To account for this variation, in some embodiments of the present invention, a profile is assembled of the administrative activities performed over the group of monitored computers in any given system, and this profile is applied in analyzing the administrative activities performed by the computers in the group. One way in which the profile can be used is in assigning respective weights to the administrative activities in a manner that reflects the respective frequencies of performance of these administrative activities by the computers in the system. The weights are then applied in computing a score for each computer, such that the combination of the administrative activities performed by that computer is considered anomalous if the weighted score exceeds a certain threshold. Specifically, administrative activities that are common in a given computer system receive low weights in that system, while unusual activities receive higher weights. In one embodiment, the respective weight for each type of administrative activity is in inverse proportion to the number of the computers performing the administrative activity during a certain period of time.

The combined use of computer-specific baselines and system-wide profiles enables embodiments of the present invention to detect suspicious administrative activities without prior definition of which activities should be considered anomalous. Rather, the anomaly detector itself learns the individual computer baselines and system-wide profile, and determines the degree to which any given combination of administrative activities should be considered anomalous. The present embodiments are therefore tolerant of changes in system configuration and even to errors of configuration, meaning that suspicious anomalies will be detected reliably, with a low rate of false alarms.

System Description

FIG. 1 is a block diagram that schematically shows a computer system 20, in which administrative activities are monitored in accordance with an embodiment of the present invention. System 20 comprises multiple personal computers and servers 24 (collectively referred to as host computers, or simply "hosts"), which are connected to a network 26, such as a local area network. Typically, each server 24 maintains a log 28 of actions performed by and on the server, such as logins, commands received and executed, and access to various resources on or via the server. Personal computers 22 may maintain similar logs (which are omitted from the figure for the sake of simplicity). Typically, system 20 is connected to public networks 30, such as the Internet, via a gateway 32, as is known in the art.

System 20 includes an authentication server 34, which authenticates and authorizes the users and computers in the system to perform requested activities, including specifically administrative activities. Authentication server 34 typically runs a directory service, which lists the authorized users and their respective privileges and credentials in system 20. Common directory services of this sort include, for example, the Microsoft® Active Directory service and Kerberos. Before performing privileged activities, hosts 22 and 24 must typically communicate with server 34 in order to receive the necessary permission. Server 34 authenticates and authorizes all users and computers in system 20 while enforcing security policies. Thus, when a user logs into a computer in system 20, server 34 checks the submitted password and determines whether the user is an administrator or a standard user. Server 34 typically maintains a log 36 of such activities and communications.

An anomaly detector 40 receives and processes information via network 26 from and about hosts 22, 24, and processes the information in order to detect anomalous administrative activities. Typically, anomaly detector 40 comprises a general-purpose computer, which includes a processor 42 and a memory 44 and is programmed in software to carry out the functions that are described herein. This software may be downloaded to the computer in electronic form, over a network, for example. Additionally or alternatively, the software may be stored on tangible, non-transitory computer-readable media, such as optical, magnetic, or electronic memory media. Further additionally or alternatively, at least some of the functions of processor 40 may be carried out by hard-wired or programmable digital logic circuits.

Although anomaly detector 40 is shown and described here for the sake of simplicity as a single, standalone unit, in practice the functions of the anomaly detector may be integrated with other software-based functions in a single server and/or distributed over a group of servers. In particular, the anomaly detector may be integrated in a server that also monitors and investigates other types of security threats in system 20. Such a server may also, for example, perform the anomaly detection functions described in the above-mentioned WO 2013/014672 and/or the forensic functions described in the above-mentioned WO 2014/111863.

Methods for Detection of Anomalous Activities

Figure 2:
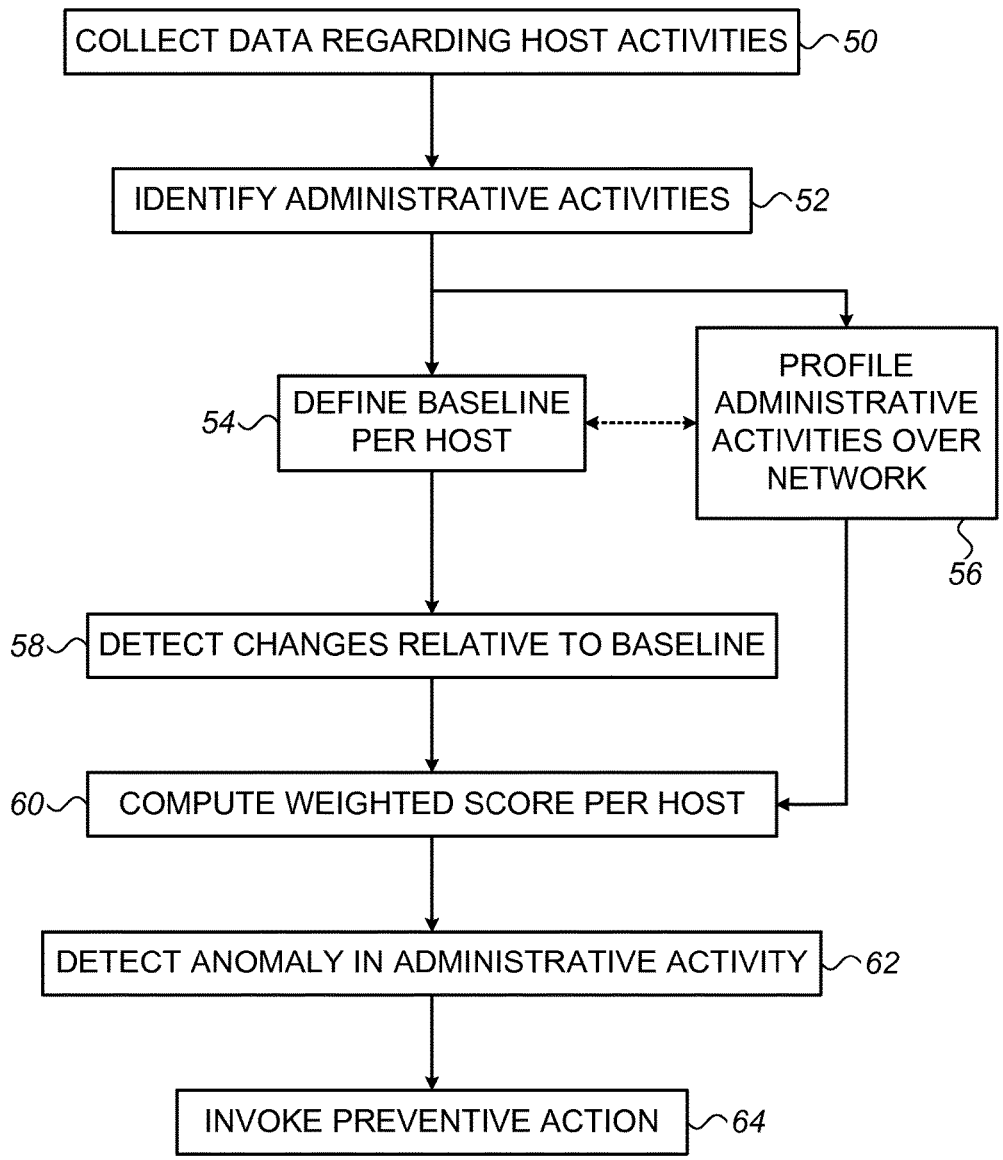
FIG. 2 is a flow chart that schematically illustrates a method for identifying anomalous administrative activities, in accordance with an embodiment of the invention.

FIG. 2 is a flow chart that schematically illustrates a method for identifying anomalous administrative activities, in accordance with an embodiment of the invention. This method is described, for the sake of clarity and concreteness, with reference to anomaly detector 40 and the other elements of system 20. Alternatively, however, the techniques that are described herein may be implemented in substantially any computer with suitable processing capabilities and access to the necessary records of host activities. The steps in the method of FIG. 2 are shown in serial order for logical clarity, but in practice, the actions involved in the method are typically performed continually or at least repeated periodically, and may go on in parallel.

Processor 42 begins by collecting data regarding activities of hosts in the system being monitored (such as computers 22 and servers 24 and 34 in system 20), at a data collection step 50. The required data is typically collected, for example, by periodically reading information from logs 28 and 36. Processor 42 stores the collected data in memory 44 for further processing.

Within the collected data, processor 42 identifies administrative activities, at an activity sorting step 52. Generally speaking, as defined above, administrative activities are those that require elevated privileges in system 20. Practically speaking, a list of administrative activities is defined in advance, possibly with subsequent refinements from time to time, and is stored in memory 44. Processor 42 identifies activities that meet the criteria of the list. The list of administrative activities typically includes, for example, some or all of the following types of activities:
  Use of a secure shell (SSH) protocol;
  Login as an administrator;
  Remote code execution;
  Access to administrative resource shares;
  Remote desktop operation on servers 24;
  Access to servers of servers in system 20; and
  Access to specified Web addresses on network 26 that are reserved for administration.

Additionally or alternatively, anomaly detector 40 may receive and store a list of administrative protocols and/or software programs that are used in system 20, and may then identify administrative activities by detecting uses of the administrative protocols and/or programs in the set defined by the list. In other words, any use of certain protocols or programs that are reserved in system 20 for administrators will be identified as an administrative activity.

As another example, simply registering a given host in an organizational unit of the directory service that is classified as an administrative unit in system 20 may be classed as an administrative activity.

As a further example, certain types of activities that are not necessarily administrative in character may be labeled as administrative by anomaly detector 40. For example, in performing networking configuration tasks, administrators may sometimes attempt to communicate with non-existent network addresses and non-existent subnets. Therefore, the anomaly detector may classify attempts to access non-existent network addresses and subnets as administrative activities.

Various methods of data analysis may be applied in recognizing the types of administrative activities defined above. For example, logins to administrator accounts may be detected by matching a suitable regular expression to the records in authentication log 36, such as the following regular expression:

regex='.*(admin|informationtechnology|information
technology|systemnt|systemnt|administrators|
(˜|/)it($|/)).*'

As another example, remote code execution attempts in server logs 28 may be recognized by identifying remote procedure call (RPC) requests to a universally unique identifier (UUID) that is known as a service used to run code on remote hosts, such as the following UUIDs:
'367ABB81:9844:35F1:AD32:98F038001003'
'378E52B0:C0A9:11CF:822D:00AA0051E40F'
'86D35949:83C9:4044:B424:DB363231FDOC'
'1FF70682:0A51:30E8:076D:740BE8CEE98B'
'0A74EF1C:41A4:4E06:83AE:DC74FB1CDD53'

Alternatively or additionally, processor 42 may recognize Server Message Block (SMB) requests with certain pipes that are known as services for running code on remote hosts, such as the 'svcctl' and 'atsvc' pipes.

For more precise classification, processor 42 may attempt to identify, for each such RPC or SMB request, a corresponding administrator authentication session in log 36 within some time limit, for example within one minute of the RPC or SMB request. If such an authentication session is found, processor 42 records the RPC or SMB request as an administrative activity.

For each host (computer 22 or server 24) in system 20, anomaly detector 40 computes an administrative activity baseline, at a baseline definition step 54. The baseline $B_h$ of activities a for a given host h is defined as:

$$B_h = d \in T\{a \in A_d \vee a_h \wedge a_s\}$$

wherein $A_d$ is the set of all activities $a_h$ performed by host h on day d that are classified as administrative activities $a_s$. An administrative activity $a_s$ in this context is typically defined as a combination of an action (such as use of a particular protocol) and a target (such as the host to which a command using the protocol is directed). In other words, the same type of action directed to two different targets will be included as two distinct activities in the baseline; but repetition of the same activity within the given collection period will have no effect on the baseline. The baseline is taken over a training period T, which may be set, for example, to be twenty-one days. Typically, the baseline is updated periodically, for example, daily. Alternatively, longer or shorter collection and training periods may be defined.

Anomaly detector 40 also computes a profile of administrative activities of all of the monitored hosts 22, in system 20, at a profiling step 56. The profile indicates, for the current training period, how many hosts have performed each type of administrative activity that is being monitored.

Figure 3:
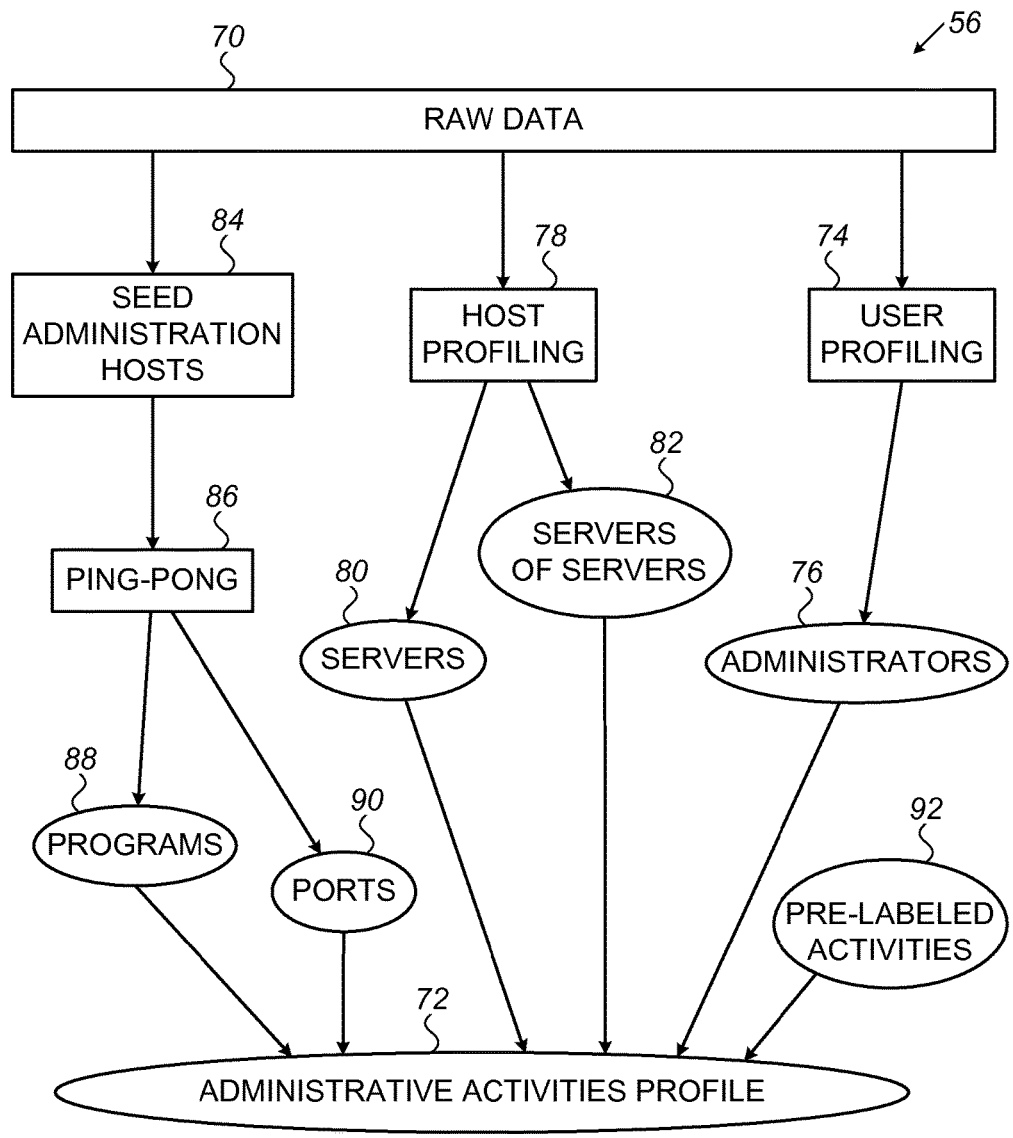
FIG. 3 is a block diagram that schematically illustrates a method for profiling administrative activity in a network, in accordance with an embodiment of the invention.

FIG. 3 is a block diagram that schematically shows details of profiling step 56, in accordance with an embodiment of the invention. Aspects of the elements of FIG. 3 also play a role in identifying administrative activities at step 52.

Profiling begins from raw data 70 collected at step and results in compilation of an administrative activities profile 72. As explained above, multiple types of activities and information go into this profile:

User profiling 74 identifies computers 22 in system 20 from which users log in or otherwise identify themselves as administrators 76.

Host profiling 78 generates a list 80 of servers 24 and server activities in system 20. As explained above, certain server activities, such as remote code execution, are classified as administrative activities. The host profiling generates in particular a list 82 of servers of servers, i.e., servers that are normally accessed only by other servers (such as a database server that provides data to a Web server, for example). Any user access to a server in list 82 is typically identified as administrative.

Administrative host seeding 84 identifies hosts whose functions are essentially administrative. Within this cohort, administrative programs 88 may be identified, as well; and a "ping-pong" process may be applied to identify ports 90 used by programs 88 and further refine the list of administrative programs. On the other hand, certain hosts, such as servers that perform anti-virus functions, perform so many administrative activities with such regularity that it may be preferable to exclude them from the profile (and possibly not monitor them at all in the present context).

Pre-labeled activities 92—as explained above, activities that are not necessarily administrative in character but are labeled as administrative in the present context— are also added to profile 72.

Returning now to FIG. 2, during each monitoring period, anomaly detector 40 detects changes in the administrative activities performed by each monitored host h relative to its particular baseline $B_h$, at a change detection step 58. The monitoring period may be of any desired length, such as an hour, a day, or several days. Assuming the period to be one day, the change in administrative activities for host h on day d relative to its baseline is defined as $D_{h,d} = A_{h,d}/B_h$.

Based on the changes found for each host at step 58 and the profile assembled at step 56, processor 42 computes a weighted anomaly score for each host, at a weight computation step 60. The weight computed for each administrative activity depends on the frequency of performance of the activity over all the monitored hosts, and decreases as the frequency increases. Specifically, in the present embodiment, processor 42 typically counts the number of hosts that have performed each given administrative activity $a_s$ during the current training period, and calculates a weight $w_s$ that is inversely proportional to this number:

$$w_s = 1/|\{h \vee \exists \{a \vee a_h \wedge a_s\}\}|$$

The anomaly score for each host is then given by the sum of the weights of the administrative activities that have been performed by that host and are not included in the baseline activity set of the host:

$$S_{h,d} = \sum_{a \in D_{h,d}} w_s$$

The weights $w_s$ are not necessarily constant over time, but may rather change with changes in the profile of administrative activities in system 20. Each non-baseline activity $a_s$ (meaning a particular administrative action directed to a particular target, as explained above) is typically counted only once in this context per detection period. In other words, if the detection period is one day, and a given host initiates three SSH sessions on a particular server during the day in question, the weight assigned to this action is added only once to the score for the given host. Alternatively, other score computation algorithms may be applied.

Processor 42 compares the host scores to a predefined threshold, at an anomaly detection step 62. The threshold is chosen to give the optimal tradeoff between detection sensitivity and false alarm rate, and may be adjusted adaptively over time. Hosts whose anomaly scores exceed the threshold are flagged as possible sources of suspicious behavior. Anomaly detector 40 automatically invokes preventive action with respect to these hosts, at an activity inhibition step 64. This action may involve, at the simplest level, issuing an alarm to a system administrator, for example. Alternatively or additionally, anomaly detector 40 may quarantine hosts that exhibit suspicious behavior and prevent them entirely from communicating with other computers in system 20, or may instruct authentication server 34 to downgrade the privileges of these hosts.

On the other hand, as noted earlier, some hosts (particularly certain types of servers) routinely perform large numbers of administrative actions and may, in consequence, receive scores at step 60 that regularly exceed the threshold. In order to avoid repeated false alarms with respect to these hosts, anomaly detector 40 may place them in a whitelist that is excluded from further anomaly monitoring. For example, a host whose average score over a certain period, such as a week, is greater than a predefined threshold may be moved to the whitelist and ignored thereafter.

Figure 4:
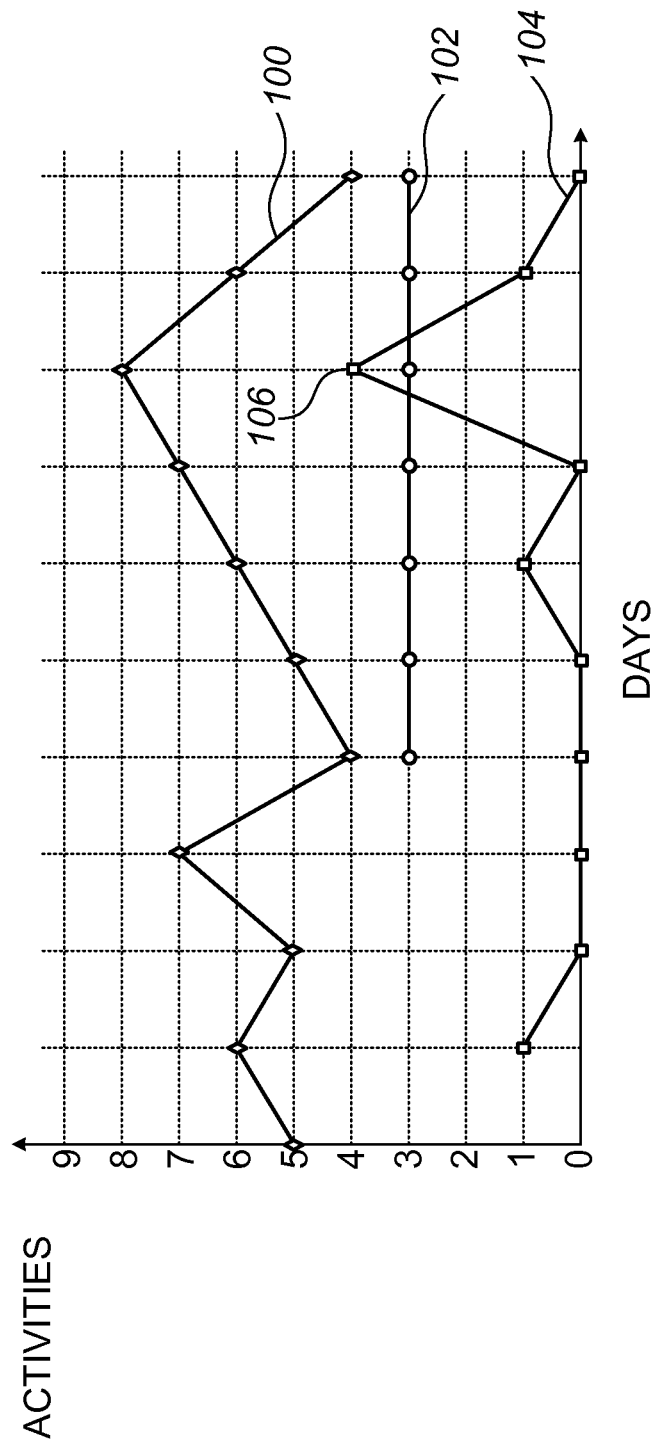
FIG. 4 is a plot that schematically shows levels of administrative activities over time, in accordance with an embodiment of the invention.

FIG. 4 is a plot that schematically shows levels of administrative activities over time in system 20, in accordance with an embodiment of the invention. The numbers of administrative activities shown on the vertical axis are arbitrary and are presented solely for the sake of illustration. An upper curve 100 shows the overall number of administrative activities performed by a given computer 22 in system 20 day by day. On the basis of these numbers and other factors, a threshold level 102 is established. This level may change over time, either manually or under administrative control, as the number and types of administrative activities by computer 22 changes over time.

A lower curve 104 shows the day-by-day number of administrative activities carried out by computer 22 that are not a part of its baseline activity set. In other words, curve 104 refers to a subset of the total administrative activity reflected by curve 100 that falls outside the baseline set. On most days, computer 22 performs no more than a single anomalous administrative activity of this sort. A peak 106, however, illustrates an abrupt increase in the number of these anomalous administrative activities performed by the computer on a certain day. Because peak 106 (or the score calculated on the basis of the peak at step 60) is above threshold level 102, anomaly detector 40 will detect the peak as suspicious and will initiate appropriate preventive action.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for monitoring, comprising:
   collecting, by a processor, data regarding activities of a plurality of computers in a computer system;
   identifying in the plurality of computers, computers whose users identify as administrators;
   identifying programs run by the computers identified as administrative;
   generating a list of administrative activities of a plurality of different types, involving access to other computers, responsive to the identified programs and ports used by the identified programs;
   identifying in the collected data, activities included in the generated list of administrative activities involving access to other computers;
   assigning respective weights to the administrative activities in the generated list responsively to respective frequencies of performance of the administrative activities in the computer system, such that the respective weights decrease as the respective frequencies increase;
   determining for each of the identified activities, a target computer of the activity;
   establishing, for each of a plurality of computers in the computer system, a respective baseline including the targets accessed by the computer using one or more of the types of administrative activities in the generated list, and the specific types of administrative activities used in accessing each of the targets by the computer;
   determining based on the collected data, the administrative activities performed by at least a group of the computers in the system, over a predetermined period, and the corresponding targets of the administrative activities;
   determining pairs of the administrative activities and corresponding targets performed over the predetermined period by each of the computers in the group, not included in the respective established baseline of the computer;
   computing, by the processor, a score for each of the computers, as a sum of the weights of the determined pairs of the administrative activities and corresponding targets performed by the computer during the predetermined period, that are not in the respective baseline, and deciding that the combination of the administrative activities performed by the computer is anomalous if the score exceeds a predefined threshold; and
   upon detecting that a given computer in the system has performed an anomalous combination of administrative activities, initiating an action to inhibit malicious exploitation of the given computer,
   wherein the different types of the administrative activities comprise accessing non-existent network addresses and non-existent subnets, and
   wherein assigning the respective weights comprises calculating a respective weight for each type of administrative activity in inverse proportion to a number of the computers performing the administrative activity.

2. The method according to claim 1, wherein the different types of the administrative activities in the defined list, include:
  access to administrative resource shares.

3. The method according to claim 1, wherein the plurality of different types of administrative activities comprises a set of administrative protocols, and wherein determining the administrative activities comprises detecting uses of the administrative protocols in the set.

4. The method according to claim 1, wherein establishing the respective baseline comprises identifying a set of the administrative activities performed by the computer over a first period of time.

5. The method according to claim 1, wherein determining the administrative activities comprises establishing a profile of the administrative activities performed over the group of the computers, and wherein detecting that a computer has performed an anomalous combination of the administrative activities comprises applying the profile in analyzing the administrative activities performed by the computer.

6. The method according to claim 1, wherein the different types of the administrative activities in the defined list, include: remote desktop operation on servers in the system.

7. The method according to claim 1, wherein the different types of the administrative activities in the defined list, include: access to servers-of-servers in the system.

8. The method according to claim 1, wherein the different types of the administrative activities in the defined list, include: access to specified Web addresses that are reserved for administration.

9. Monitoring apparatus, comprising:
  a memory, configured to store a definition list of a plurality of different types of administrative activities involving access to other computers, in a computer system; and
  a processor, which is configured to collect data regarding activities of a plurality of computers in the computer system, to identify in the plurality of computers, computers whose users identify as administrators, to identify programs run by the computers identified as administrative, to add to the definition list administrative activities, involving access to other computers, responsive to the identified programs and ports used by the identified programs, to identify in the collected data, activities included in the definition list, to assign respective weights to the administrative activities responsively to respective frequencies of performance of the administrative activities in the computer system, such that the respective weights decrease as the respective frequencies increase, to determine for each of the identified activities, a target computer of the activity, to establish, for each of a plurality of computers in the system, a respective baseline including the targets accessed by the computer using one or more of the types of administrative activities in the definition list, and the specific types of administrative activities used in accessing each of the targets by the computer, to determine based on the collected data, the administrative activities performed by at least a group of the computers in the system, over a predetermined period, and the corresponding targets of the administrative activities, to determine pairs of the administrative activities and corresponding targets performed over the predetermined period by each of the computers in the group, not included in the respective established baseline of the computer, to compute a score for each of the computers, as a sum of the weights of the determined pairs of the administrative activities and corresponding targets performed by the computer during the predetermined period, that are not in the respective baseline, and deciding that the combination of the administrative activities performed by the computer is anomalous if the score exceeds a predefined threshold, and upon detecting that a computer in the system has performed an anomalous combination of administrative activities, to initiate an action to inhibit malicious exploitation of the given computer,
  wherein the different types of the administrative activities in the definition list comprise accessing non-existent network addresses and non-existent subnets, and
  wherein the processor is configured to calculate the respective weight for each type of administrative activity in inverse proportion to a number of the computers performing the administrative activity.

10. The apparatus according to claim 9, wherein the different types of the administrative activities include:
  use of a secure shell protocol;
  login as an administrator;
  remote code execution;
  access to administrative resource shares;
  remote desktop operation on servers in the system;
  access to servers of servers in the system; and
  access to specified Web addresses that are reserved for administration.

11. The apparatus according to claim 9, wherein the definition list of the plurality of different types of administrative activities comprises a specified set of administrative protocols, and wherein the processor is configured to determine the administrative activities by detecting uses of the administrative protocols in the set.

12. The apparatus according to claim 9, wherein the respective baseline comprises a set of the administrative activities performed by the computer over a first period of time.

13. The apparatus according to claim 9, wherein the processor is configured to establish a profile of the administrative activities performed over the group of the computers, and to apply the profile in analyzing the administrative activities performed by the computers in the group.

14. A computer software product, comprising a non-transitory computer-readable medium in which program instructions are stored, which instructions, when read by a computer, cause the computer to store a definition list of a plurality of different types of administrative activities involving access to other computers, in a computer system, to collect data regarding activities of a plurality of computers in the computer system, to identify in the plurality of computers, computers whose users identify as administrators, to identify programs run by the computers identified as administrative, to add to the definition list administrative activities, involving access to other computers, responsive to the identified programs and ports used by the identified programs, to identify in the collected data, activities included in the definition list, to assign respective weights to the administrative activities responsively to respective frequencies of performance of the administrative activities in the computer system, such that the respective weights decrease as the respective frequencies increase, to determine for each of the identified activities, a target computer of the activity, to establish, for each of a plurality of computers in the system, a respective baseline including the targets accessed by the computer using one or more of the types of administrative activities in the definition list, and the specific types of administrative activities used in accessing each of the targets by the computer, to determine based on the collected data, the administrative activities performed by at least a group of the computers in the system, over a predetermined period, and the corresponding targets of the administrative activities, to determine pairs of the administrative activities and corresponding targets performed over the predetermined period by each of the computers in the group, not included in the respective established baseline of the computer, to compute a score for each of the computers, as a sum of the weights of the determined pairs of the administrative activities and corresponding targets performed by the computer during the predetermined period, that are not in the respective baseline, and deciding that the combination of the administrative activities performed by the computer is anomalous if the score exceeds a predefined threshold, and upon detecting that a given computer in the system has performed an anomalous combination of administrative activities, to initiate an action to inhibit malicious exploitation of the given computer, wherein the different types of the administrative activities in the definition list comprise accessing non-existent network addresses and non-existent subnets, and wherein the instructions cause the computer to calculate the weight for each type of administrative activity in inverse proportion to a number of the computers performing the administrative activity.

15. The product according to claim 14, wherein the instructions cause the computer to establish a profile of the administrative activities performed over the group of the computers, and to apply the profile in analyzing the administrative activities performed by the computers in the group.

\* \* \* \* \*